United States Patent [19]
Samour et al.

[11] 3,861,948
[45] Jan. 21, 1975

[54] PRESSURE SENSITIVE ADHESIVE TAPE
[75] Inventors: Carlos M. Samour, Wellesley Hills, Mass.; Mildred C. Richards, Wakefield, Mass.
[73] Assignee: The Kendall Company, Walpole, Mass.
[22] Filed: Nov. 12, 1973
[21] Appl. No.: 414,930

Related U.S. Application Data
[63] Continuation of Ser. No. 255,834, May 22, 1972, abandoned.

[52] U.S. Cl.... 117/122 PF, 117/122 PA, 260/80.73
[51] Int. Cl. ............................................. C09j 7/02
[58] Field of Search .... 117/122 PA, 122 PF, 122 P, 117/76 A, 68.5; 260/80.73

[56] References Cited
UNITED STATES PATENTS
3,475,363 10/1969 Gander .......................... 156/331 X
3,547,950 12/1970 Gander .......................... 260/33.4 X Primary Examiner—William D. Martin
Assistant Examiner—Bernard D. Pianalto

[57] ABSTRACT

An adhesive tape comprising a flexible backing and and supported thereon a water-insoluble pressure sensitive adhesive polymers are made by copolymerizing ionic methacrylic or acrylic monomers of the quaternary or betaine type, with or without the presence of the corresponding unquaternized monomer, with certain alkyl acrylates.

2 Claims, No Drawings

PRESSURE SENSITIVE ADHESIVE TAPE

This is a continuation of application Ser. No. 255,834, filed May 22, 1972, and now abandoned.

This invention relates to water-insoluble pressure sensitive adhesive polymers, and to flexible sheet material coated with polymers including pressure sensitive adhesive tape.

It has previously been proposed in Gander U.S. Pat. No. 3,475,363 to provide pressure sensitive adhesive copolymers by aqueous emulsion polymerization of dimethylaminoethyl methacrylate with certain alkyl acrylates. It has also been proposed in Gander U.S. Pat. No. 3,547,950 to provide water-soluble copolymers of quaternized dimethylaminoethyl methacrylate with esters of acrylic acid and/or esters of methacrylic acid. The latter copolymers, although desired as being adherent to human skin when used in the form of a cement or viscous solution of the copolymer in an organic solvent, are not pressure sensitive adhesives when free from solvent. It has also been proposed to employ various quaternized dimethylaminoethyl methacrylates containing lipophilic groups for their effectiveness as emulsion stabilizers during aqueous emulsion polymerization of acrylic esters, leading to formation of copolymers suitable for use as adhesives, as in our copending application Ser. No. 867,899 filed Oct. 20, 1969 and in our Belgian Pat. No. 757,751 dated Dec. 31, 1970.

The polymers of the present invention which form the principal constituent of the adhesive mass possess both water-insolubility and pressure sensitive adhesive characteristics. In addition they provide markedly stronger adhesion and markedly faster development of adhesion after initial contact with a surface than do the copolymers of Gander U.S. Pat. No. 3,475,363. These polymers are copolymers of (a) certain ionic acrylic or methacrylic esters, or mixtures thereof with certain nonionic dialkylaminoalkyl acrylic or methacrylic esters, with (b) certain alkyl acrylates, the amount of ionic ester being from 0.5 to 20%, preferably from 1.0 to 10% by weight of the total essential monomer, the amount of the nonionic ester being up to 19.5% by weight of the total essential monomer, and the alkyl acrylates constituting the remainder of the essential monomers. The alkyl acrylates are those having from 4 to 14 carbon atoms in the alkyl groups. When a mixture of individually different alkyl acrylates is employed, as is preferred, an individual alkyl acrylate may have up to 18 carbon atoms in its alkyl group, but the average size of the alkyl groups is from 4 to 14 carbon atoms in the mixture. When the amount of ionic monomer exceeds 10% by weight, the minimum average size of the alkyl group in the alkyl acrylate monomer required is 6 carbon atoms and becomes progressively larger until, when the amount of ionic monomer reaches 20% by weight, the alkyl groups must have an average of 8 to 14 carbon atoms. When the ionic monomer is from 1 to 10% by weight of the total essential monomers, it is preferred that the alkyl groups of the alkyl acrylate have an average of 4 to 8 carbon atoms.

The ionic monomers useful in making the copolymers of the present invention include those having the formula

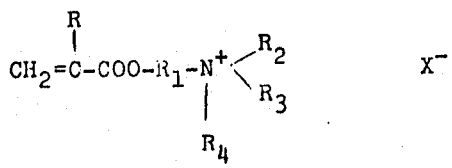

in which R represents hydrogen or methyl; $R_1$ represents an alkylene group having 2 to 12 carbon atoms including ethylene, propylene, butylene, hexylene and decylene or $R_1$ represents a 2-hydroxypropylene group; $R_2$ and $R_3$ each independently represents an alkyl group having from 1 to 4 carbon atoms; $R_4$ represents (a) an alkyl group having from 1 to 6 carbon atoms, or (b) a group having the formula

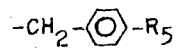

in which $R_5$ represents hydrogen or an alkyl group having from 1 to 6 carbon atoms, or (c) a group having the formula $-CH_2-Y$ in which Y represents $-CONH_2$, $-COOH$, or $-COOR_6$ in which $R_6$ represents an alkyl group having from 1 to 6 carbon atoms; and in which X represents Cl Br, or $-SO_4R_7$ where $R_7$ represents methyl, ethyl, or tolyl.

It also includes ionic monomers of the betaine type having the formula

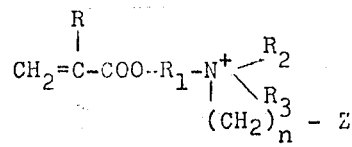

in which R, $R_1$, $R_2$ and $R_3$ have the same meanings as above and in which Z represents $-SO_3^-$, n being 2 to 4, or $-COO^-$, n being 1 to 4, preferably 1 to 2.

The preferred ionic monomers are those in which $R_1$ is ethylene or trimethylene and $R_2$ and $R_3$ each is methyl or ethyl.

The nonionic dialkylaminoalkyl acrylic or methacrylic esters which can be used in admixture with the ionic monomers are those having the formula

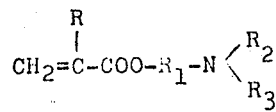

in which R, $R_1$, $R_2$ and $R_3$ have the same meanings as above. It is preferred to have no dialkylaminoalkyl acrylic or methacrylic ester present.

The polymers of this invention may contain recurring units other than essential ionic acrylate or methacrylate (or mixture of ionic with nonionic dialkylaminoalkyl acrylate or methacrylate), and alkyl acrylate recurring units. The other recurring units may be characterized in their corresponding monomeric form as monomers copolymerizable with the foregoing monomers; that is, the polymers of the adhesive coatings of this invention are polymers of monomers consisting essentially of the specified ionic acrylates or methacrylates (or mixture with nonionic, as above) and alkyl acrylates, and, optionally, one or more copolymerizable monomers in amounts which do not materially adversely affect the use of the polymers as pressure-sensitive adhesive coatings. In general, the amounts of such optional copolymerizable monomers may be up to 50% by weight of the alkyl acrylate component; however, in the case of cross-linking monomers having functional groups which can react with other reactive groups in the polymers thereby cross-linking the polymers, the amounts may be up to 10% by weight, preferably from 0.2 to 5% by weight of the alkyl acrylate. Examples of optional copolymerizable monomers include acrylonitrile, methacrylonitrile, acrylamide, methacrylamide, benzyl acrylate, dehydroabietyl acrylate, dihydroabietyl methacrylate, cyclohexyl acrylate, chloroethyl acrylate, fluoroethyl acrylate, cyanoethyl acrylate, ethoxyethyl methacrylate, vinyl esters and ethers and vinyl aromatic compounds such as vinyl acetate, vinyl butyrate, methyl vinyl ether, octyl vinyl ether, styrene; crosslinking monomers include glycidyl acrylate, glycidyl methacrylate and N-methylolacrylamide as well as divinyl compounds such as ethylene glycol diacrylate and dimethacrylate, allyl acrylate, and divinyl benzene.

The monomeric ionic acrylic and methacrylic esters can be made by conventional quaternizing procedures using conventional quaternizing agents on the appropriate dialkylaminoalkyl acrylate or methacrylate. The dialkylaminoalkyl acrylates and methacrylates are known compounds and can be prepared by esterification of the appropriate dialkylaminoalkyl alcohol with acrylic or methacrylic acid. Satisfactory products can also be obtained by first copolymerizing a dialkylaminoalkyl acrylate or methacrylate with alkyl acrylate, then reacting the copolymer with the appropriate quaternizing agent to the desired extent. All of the dialkylaminoalkyl groups in the copolymer may be quaternized or only a part of them, provided that the resultant copolymer contains at least 0.5% by weight of recurring units (either acrylate or methacrylate) in which the quaternized groups appear. Among the conventional quaternizing agents which can be used are dimethyl sulfate, chlorotoluene, chloroacetamide, xylylene dichloride, chloroacetic acid, 1,3-propane sultone, methyl toluene sulfate, methyl bromide, butyl bromide, and bromoethyl acetate.

The alkyl acrylates used in the polymers of the present invention are also well known and can be made by esterifying acrylic acid with at least one alcohol. Where only one alcohol is employed, it must have from about 4 to about 14 carbon atoms; where mixtures of alcohols are used for the esterification, the individual alcohols can contain from 1 up to and including 18 carbon atoms providing the average number of carbon atoms in the mixture of alcohols is from about 4 to about 14. In preferred embodiments of the invention, the average number of carbon atoms in the alkyl groups of the alkyl acrylates is from about 4 to about 10.

While it is possible in formulating pressure sensitive adhesive products embodying the interpolymers of the present invention, to mix with the polymer other materials for reasons incidental to or for the purpose of supplementing its inherent adhesive properties, the presence of such additional or supplemental materials is usually unnecessary. For example, instead of using a cross-linking comonomer as described above, cross-linking of the polymer can be accomplished by exposure to irradiation (e.g. U.V. or electron beam), by adding organic peroxides, epoxy compounds, or polyisocyanates. The polymers of this invention are compatible with a variety of resins, among which are tackifier resins such as rosin and rosin esters, hydrogenated rosin, phenolformaldehyde resins, terpene resins, etc., as well as with plasticizers commonly used in pressure sensitive adhesive compositions such as dialkyl phthalates, e.g., dioctyl phthalate, dialkyl esters of aliphatic dicarboxylic acids, e.g., dioctyl adipate, diphenyl ether, tricresyl phosphate, and the like, any of which can be used in conjunction with the polymers of the present invention to modify their properties.

The polymers of the present invention may be prepared by polymerizing together two essential types of monomers described above in any of the usual emulsion or solution polymerization procedures. Various types of catalysts or initiators useful in the polymerization of acrylate and methacrylate monomers may be employed in the production of the polymers of this invention. Examples of peroxide-type, free radical polymerization initiators are inorganic peroxides, such as hydrogen peroxide and barium peroxide; organic peroxides such as dicumyl peroxide, di-(tertiary butyl) peroxide, cumyl hydrogen peroxide, diacetyl peroxide, and dibenzoyl peroxide; azo-bis-(aliphatic nitriles); and inorganic per-acids, such as ammonium persulfate, potassium persulfate and potassium percarbonate. The initiators can be used alone or in the presence of reducing agents such as ferrous salts, cuprous salts, bisulfite, thiosulfate, hydrosulfite and tetrathionate salts, dimethylaniline, triethanolamine, and alkylene polyamines. Other types of initiating systems may be used for the preparation of these polymers for example, ultraviolet light in the presence of organic peroxides or photosensitizers such as benzophenone. The choice of catalysts depends upon a variety of factors well known to the art. The type of monomers to be polymerized and the type of polymerization, whether solution or emulsion polymerization, the pH of the emulsion, the type of the emulsifier and the temperature of the emulsion are also factors. In general, the amounts of the initiators used in the preferred aqueous emulsion polymerization system may vary from as little as 0.1 or lower to about 2 parts per 100 parts of total monomers.

Many different types of emulsifiers can be used in aqueous emulsion polymerization as is well known to the art including anionic, nonionic and cationic emulsifiers. Emulsifiers of these types commonly used in acrylate and methacrylate aqueous emulsion polymerization systems can in general be used with success in preparing the polymers of the present invention. The polymer can be used in the form of the emulsion or dispersion in which it is produced with or without the addition of conventional thickening agents or it can be separated from the polymerization medium by coagulation with acids, salts, or by freezing, and the resulting coagulum may be washed and/or dried before use if desired.

Polymers prepared by solution polymerization may be used in the form of the solution as it is obtained from the polymerization vessel, or it may be diluted if desired; from it a film or coating of the polymer may be laid down on a conventional flexible backing or tape in the usual manner.

The following examples are intended to illustrate more fully the nature of the invention without acting as a limitation upon its scope.

EXAMPLE 1

A monomer mixture containing 47.5g. of 2-hydroxy-3-methacryloyloxypropyl trimethyl ammonium chloride and 552.0g. of 2-ethylhexyl acrylate was dissolved in 250 ml. ethyl acetate and 300 ml. methanol to provide a clear homogeneous solution. This solution was charged to a 3 liter round bottom, 3-neck flask equipped with stirrer, condenser, thermometer and dropping funnel. The flask had previously been flushed with nitrogen and was blanketed with nitrogen while the solution was added. The solution was heated to 50°C. and 2 ml. of a catalyst solution (prepared by dissolving 1.25g. of 2,2'-azobis (2-methylpropionitrile) in 25 ml. ethyl acetate) was added to the reaction solution. About 1 hour after the addition of the catalyst solution, the viscosity of the reaction solution began to increase. The reaction was continued for about nine hours, maintaining a temperature of 65°C. while periodically adding portions of ethyl acetate to reduce viscosity and 2 ml. portions of catalyst solution until the completion of the polymerization as indicated by no further change in viscosity. The total amount of acatalyst added was 0.275% by weight of the total monomers. The resulting polymer had a number average molecular weight of 67,300 as determined by Mechro Lab 502 Membrane Osmometer at 37°C. (toluene). The polymer solution was spread on 1.5 mil polyethylene terephthalate film and dried then tested for adhesive properties as described following Example 56.

EXAMPLE 2-3

A. There was dissolved in 70 ml. methanol 50.6g. of 2-hydroxy-3-methacryloyloxypropyl trimethyl ammonium chloride and there was stirred into the solution 38.8g. of the sodium salt of p-toluenesulfonic acid. The solution was stored under refrigeration for about a week, then the solvent was removed and the solid residue was digested with chloroform to extract 2-hydroxy-3-methacryloyloxypropyl trimethyl ammonium toluene sulfonate.

B. The monomer prepared as described in (A) above (5g.) was then dissolved in 20 ml. methanol, added to 95g. of 2-ethylhexyl acrylate in 80 ml. ethyl acetate and polymerized as described in Example 1. The pressure sensitive adhesive properties of the copolymer were determined as set forth following Example 56 in Table VI, the polymer being identified as Example 2.

A separate copolymer was prepared using 5g. of the same monomer described in A above together with 11.4g. of ethyl acrylate and 83.6g. of 2-ethylhexyl acrylate using the procedure of Example 1, and its properties were determined. One portion of this polymer solution was spread on film and dried as described in Example 1, identified as Example 3a in Table VI; to another portion was added 2% (by weight of the polymer) of benzoyl peroxide, and after drying this product was cured for 10 minutes at 120°C.; it is identified as Example 3b.

EXAMPLES 4-5

A. There was dissolved in 200 ml. methyl ethyl ketone 72g. (1 mole) of beta-propiolactone. The solution was cooled to about 8°C. and there was slowly stirred in 157g. (1 mole) of dimethylaminoethyl methacrylate over a period of about 20 minutes. The reaction was exothermic and crystallization began before addition of the methacrylate had been completed. The reaction mixture was allowed to stand at room temperature for about an hour, then stored overnight at about 0°C., after which it was filtered, the crystals washed with cold methyl ethyl ketone, and dried under vacuum at room temperature. The product (m.p. 112°-118°C.; 115°-120°C. after recrystallization) was N-methacryloyloxyethyl-N,N-dimethyl-N,2-ethyl carboxybetaine a quaternary monomer.

B. The monomer product of part A was copolymerized with other monomers by the procedure of Example 1 (except that the solvent used was a mixture of ethyl acetate, methyl alcohol and toluene in the proportions 3/1/3) using monomer mixtures as follows:

Table I

| | Parts by Weight | |
| --- | --- | --- |
| | Example 4 | Example 5 |
| Quaternary monomer | 9.12 | 9.00 |
| Ethyl acrylate | 10.87 | 10.71 |
| 2-Ethyl hexyl acrylate | 80.00 | 78.84 |
| Glyidyl acrylate | — | 1.45 |

Because the copolymer product of Example 4 was found to be very soft, varying quantities of benzoyl peroxide (0.5% to 2.0% by weight) were mixed with different samples and they were cured by heating 1-10 minutes at 250°F. after spreading on polyethylene terephthalate film and before testing, as follows:

Table II

| Example | 4a | 4b | 4c | 4d | 4e | 4f | 4g |
| --- | --- | --- | --- | --- | --- | --- | --- |
| Benzoyl peroxide % by wt. of polymer | 0.5 | 0.5 | 1.0 | 1.0 | 1.0 | 1.0 | 2.0 |
| Cure time, min. at 250°F. | 5 | 10 | 1 | 2 | 3 | 5 | 5 |

The product of Example 5 was also cured by heating 5 minutes at 250°F. before testing.

EXAMPLES 6-21

A. There was dissolved in 450 ml. of ethyl acetate 61g. of 1,3-propane sultone. The solution was cooled to about 10°C., and there was stirred in slowly 79g. of dimethylaminoethyl methacrylate. After standing overnight at 0°C. the white crystalline product was removed by filtration, washed with cold ethyl acetate, and dried at room temperature. The quaternary monomer, N-methacryloyloxyethyl-N,N-dimethyl-N,3-propylsulfobetaine, was employed in making the copolymers below.

B. The quaternary monomer product of A above was polymerized in aqueous emulsion by dispersing it along with other monomers in the proportions specified in the following table, in 280g. of water containing the specified quantity of polymerizable emulsifier under a blanket of nitrogen. The pH of the resulting emulsion was 5.5–6.0. After cooling the emulsion to 16°C. 10 ml. of 3% by weight aqueous hydrogen peroxide was added, followed by the dropwise addition of a reductant solution prepared by dissolving 0.02g. ferrous ammonium sulfate and 0.4g. ascorbic acid in 10g. water. Polymerization was initiated upon the addition of an average of 2.5 ml. of the reductant solution; and exotherm of 12° was observed seven minutes after initiation. The total reductant solution employed in each polymerization is set forth in the following table. After polymerization had ceased as indicated by the absence of an exotherm upon the addition of an increment of hydrogen peroxide and reductant solution, the polymer was coagulated with isopropanol, washed with water and dissolved in a methyl ethyl ketone/toluene 50:50 by volume mixture. After coating on 1.5 mil polyethylene terephthalate film, drying and curing, a pressure-sensitive adhesive tape having the properties set forth in Table VI was obtained.

of quaternizing agent equal to that required to react with all of the amino groups present in the copolymer, identified as 100% in the following table, or some smaller quantity identified as a percentage of the amount theoretically needed. In some cases, a mixture of two different quaternizing agents was used. The mixture was then tumbled in a closed container for about a week at room temperature to form the corresponding quaternized copolymer in solution.

The polymer solutions of the foregoing examples were spread separately on 1.5 mil polyethylene terephthalate film, dried and (in the case of those polymers containing glycidyl acrylate) cured by heating at 300°F. for a given period of time to provide a pressure sensitive adhesive tape. The adhesive properties of the tape were then determined with the results set forth in Table VI. The probe tack was determined by means of a Polyken probe tack tester as described in U.S. Pat. No. 3,214,971 having the following 4 functional parts: (1) a cylindrical steel probe attached to the compression loaded spring of (2) a series L Hunter Mechanical Force Gauge (Hunter Spring Company, Brochure 750/FG, revised February, 1961), (3) an annulus having an opening slightly larger than the diameter of the probe and (4) a carrier for the annulus which moves Table III

| Example | 6 | 7 | 8 | 9 | 10 | 11 | 12 | 13 | 14 | 15 | 16 | 17 |
|---|---|---|---|---|---|---|---|---|---|---|---|---|
| Quarternary monomer | 0.96 | 1.90 | 4.62 | 8.83 | 10.56 | 12.63 | 19.42 | 11.60 | 10.56 | 2.45 | 9.13 | 10.88 |
| Ethyl acrylate | 11.50 | 11.38 | 11.06 | 10.56 | 10.35 | 10.10 | 9.29 | — | — | 11.67 | 10.87 | 10.66 |
| 2-Ethylhexyl acrylate | 84.63 | 83.79 | 81.42 | 77.70 | 76.19 | 74.36 | 67.88 | 83.60 | 76.19 | 85.89 | 80.00 | 78.47 |
| Methyl Methacrylate | — | — | — | — | — | — | — | — | 10.35 | — | — | — |
| Emulsifier: | | | | | | | | | | | | |
| Allyl hexadecyl dimethyl ammonium chloride | 2.91 | 2.91 | 2.91 | 2.91 | — | 2.91 | 2.91 | 4.80 | — | — | — | — |
| Allyl dodecyl dimethyl ammonium chloride | — | — | — | — | 2.91 | — | — | — | 2.90 | — | — | — |
| Hexadecyl trimethyl ammonium chloride | — | — | — | — | — | — | — | — | — | 6.00 | 6.00 | 3.00 |

C. The quaternary monomer described in Example 4A was polymerized with other monomers as described in paragraph B above and summarized in the following Table IV

| Example | 18 | 19 | 20 | 21 |
|---|---|---|---|---|
| Quaternary monomer | 9.13 | 9.52 | 2.45 | 9.13 |
| Ethyl acrylate | 10.87 | — | 11.67 | 10.87 |
| 2-Ethylhexyl acrylate | 80.00 | 85.72 | 85.89 | 80.00 |
| Emulsifier: | | | | |
| Allyl hexadecyl dimethyl ammonium chloride | — | 4.76 | — | — |
| Allyl dodecyl dimethyl ammonium chloride | 3.00 | — | — | — |
| Hexadecyl trimethyl ammonium chloride | — | — | 6.00 | 6.00 |

EXAMPLES 22–57

Dimethylaminoethyl methacrylate was copolymerized in solution by the procedure of Example 1 along with other monomers as set forth in the following table. To each polymer solution there was added an amount down to bring the annulus around the probe and then up to remove the annulus therefrom. The carrier moves at a speed of 0.1 inch per second. At the beginning of the test, the carrier is at its uppermost point of travel and the annulus rests upon the carrier so that the opening in the annulus is in line with the probe positioned beneath it. In carrying out the test, a strip of tape is placed upon the annulus, adhesive side down, and spanning the annulus opening. As the carrier is driven downwardly by the synchronous motor, the adhesive surface exposed through the opening is brought into contact with the flat surface of the probe so that the tape and the annulus attached thereto are suspended on the probe as the carrier continues farther on its downward path. The carrier then reverses its movement returning to pick up the annulus, thereby separating the tape from the probe surface. Separation begins after one second contact between the probe and the adhesive. The force required to separate the tape from the probe is recorded on a gauge. The recorded value is the probe tack value. Measurements were made employing a loading of 100 grams/cm$^2$.

The peel adhesion values represent the forces in ounces required to remove a 1-inch wide adhesive tape from a stainless steel surface after contact therewith for 2 minutes at a temperature of about 75°F. The tape is stripped from the surface at an angle of 180° at a rate of 12 inches per minute.

The creep resistance values are determined by applying to a vertical stainless steel surface a strip of the adhesive tape 1 inch wide and then heating the surface to a temperature of about 160°F., after which a 1 kilogram weight is hung from the tape. The creep time is the length of time in hours required for the tape to travel one half inch on the surface. In certain examples this test was carried out at 75°F. instead of 160°F.

Table V

| Example | 22 | 23 | 24 | 25 | 26 | 27 | 28 | 29 | 30 | 31 | 32 | 33 |
|---|---|---|---|---|---|---|---|---|---|---|---|---|
| Dimethylaminoethyl methacrylate | 5.9 | 5.9 | 5.9 | 5.9 | 5.9 | 8.6 | 8.6 | 14.6 | 14.6 | 14.6 | 8.3 | 8.3 |
| Ethylacrylate | 11.2 | 11.2 | 11.2 | 11.2 | 11.2 | 10.9 | 10.9 | — | — | — | 10.5 | 10.5 |
| 2-Ethylhexyl acrylate | 82.9 | 82.9 | 82.9 / 82.9 | 82.9 | 80.5 | 80.5 | 85.4 | 85.4 | 85.4 | 77.4 | 77.4 | — |
| Acrylic acid | — | — | — | — | — | — | — | — | — | — | 3.8 | 3.8 |
| Vinyl acetate | — | — | — | — | — | — | — | — | — | — | — | — |
| Xylylene dichloride | 100 | — | 10 | — | — | — | — | — | 20 | 10 | — | — |
| Chloroacetamide | — | 100 | 90 | — | — | — | 100 | 100 | 80 | 90 | 100 | — |
| Chlorotoluene | — | — | — | 100 | — | — | — | — | — | — | — | — |
| Dimethyl sulfate | — | — | — | — | 90 | 90 | — | — | — | — | — | 90 |

| Example | 34 | 35 | 36 | 37 | 38 | 39 | 40 | 41 | 42 | 43 | 44 | 45 |
|---|---|---|---|---|---|---|---|---|---|---|---|---|
| Dimethylaminoethyl methacrylate | 4.4 | 4.4 | 4.4 | 4.4 | 4.4 | 4.4 | 8.6 | 8.6 | 8.6 | 8.6 | 8.6 | 8.6 |
| Ethyl acrylate | 11.5 | 11.5 | 11.5 | 11.5 | 11.5 | 11.5 | 10.9 | 10.9 | 10.9 | 10.9 | 10.9 | 10.9 |
| 2-Ethylhexyl acrylate | 84.1 | 84.1 | 84.1 | 84.1 | 84.1 | 84.1 | 80.5 | 80.5 | 80.5 | 80.5 | 80.5 | 80.5 |
| Glycidyl acrylate | 1.5 | 1.5 | 1.5 | 1.5 | 1.5 | 1.5 | 0.5 | 0.5 | 0.5 | 1.5 | 1.5 | 1.5 |
| Chloroacetamide | 100 | — | — | — | — | — | — | — | 100 | 100 | — | — |
| Chlorotoluene | — | — | — | — | — | — | — | — | — | — | — | — |
| Dimethyl sulfate | — | — | 90 | — | 50 | — | — | 50 | — | — | 25 | 50 |
| Chloroacetic acid | — | 100 | — | — | — | — | 100 | — | — | — | — | — |
| 1,3-Propane sultone | — | — | — | 90 | — | 50 | — | — | — | — | — | — |

| Example | 46 | 47 | 48 | 49 | 50 | 51 | 52 | 53 | 54 | 55 | 56 |
|---|---|---|---|---|---|---|---|---|---|---|---|
| Dimethylaminoethyl methacrylate | 8.6 | 8.6 | 8.6 | 15.8 | 15.8 | 15.8 | 15.8 | 8.6 | 8.6 | 8.6 | 8.6 |
| Ethyl acrylate | 10.9 | 10.9 | 10.9 | 10.1 | 10.1 | 10.1 | 10.1 | 5.5 | 5.5 | 5.5 | 5.5 |
| 2-Ethylhexyl acrylate | 80.5 | 80.5 | 80.5 | 74.1 | 74.1 | 74.1 | 74.1 | 81.1 | 81.1 | 81.1 | 81.1 |
| Vinyl acetate | — | — | — | — | — | — | — | 4.7 | 4.7 | 4.7 | 4.7 |
| Glycidyl acrylate | 1.5 | 1.5 | 3.0 | 1.5 | 1.5 | 1.5 | 1.5 | 1.5 | 1.5 | 1.5 | 1.5 |
| Chloroacetamide | — | — | — | 100 | — | — | — | 100 | — | — | — |
| Dimethyl sulfate | — | — | 90 | — | 25 | 50 | — | — | — | 50 | 25 |
| Chloroacetic acid | 100 | — | — | — | — | — | 100 | — | 100 | — | — |
| Methyl toluene sulfate | — | 100 | — | — | — | — | — | — | — | — | — |

TABLE VI

| Example | 1 | 2 | 3a | 3b | 4a | 4b | 4c | 4d | 4e | 4f | 4g | 5 | 6 |
|---|---|---|---|---|---|---|---|---|---|---|---|---|---|
| Probe tack | 510 | [5] 680 | [5] 880 | [5] 810 | 1,260 | 1,060 | 1,300 | 1,240 | 1,260 | 930 | 850 | 640 | 740 |
| Peel adhesion | 27 | 29 | ([1]) | 50 | ([1]) | 51 | ([1]) | 80 | 72 | 62 | 33 | 7 | ([1]) |
| Creep resistance | [4] 87 | 0.03 | 0.03 | N.C. | (**) | N.C. | 0.012 | 0.02 | 0.027 | N.C. | N.C. | N.C. | 0.06 |

| Example | 7 | 8 | 9 | 10 | 11 | 12 | 13 | 14 | 15 | 16 | 17 | 18 | 19 |
|---|---|---|---|---|---|---|---|---|---|---|---|---|---|
| Probe tack | 710 | 690 | 650 | 920 | 540 | 500 | 510 | 730 | 210 | 420 | 630 | 580 | 560 |
| Peel adhesion | ([1]) | 30 | 20 | ([2]) | 8 | 16 | 23 | 25 | ([1]) | ([1]) | 20 | 13 | 22 |
| Creep resistance | 0.02 | 2.4 | 23.6 | 62.5 | N.C. | N.C. | 110 | 5.6 | — | — | >430 | 230 | 1.15 |

| Example | 20 | 21 | 22 | 23 | 24 | 25 | 26 | 27 | 28 | 29 | 30 | 31 | 32 |
|---|---|---|---|---|---|---|---|---|---|---|---|---|---|
| Probe tack | 210 | 160 | 730 | 850 | [3] 630 | 710 | 1,210 | 1,240 | 810 | 380 | 320 | 490 | 990 |
| Peel adhesion | 14 | 9 | 23 | 36 | 22 | 25 | ([1]) | ([2]) | ([2]) | 17 | (***) | 16 | ([2]) |
| Creep resistance | — | — | N.C. | N.C. | N.C. | 19.7 | [4] 1.3 | (**) | 0.3 | N.C. | N.C. | N.C. | 0.69 |

| Example | 33 | 34[6] | 35 | 36 | 37 | 38 | 39 | 40 | 41 | 42 | 43 | 44 | 45 |
|---|---|---|---|---|---|---|---|---|---|---|---|---|---|
| Probe tack | 1,470 | 550 | 640 | 1,260 | 510 | 670 | 620 | 520 | 610 | 260 | 670 | 900 | 1,150 |
| Peel adhesion | ([2]) | 20 | 27 | *23 | 10 | 20 | 5 | ([2]) | 15 | ([2]) | ([1]) | 45 | 32 | 37 |
| Creep resistance | 0.05 | — | — | — | — | — | — | 0.82 | 0.02 | — | N.C. | N.C. | N.C. |

| Example | 46 | 47 | 48 | 49 | 50 | 51 | 52 | 53 | 54 | 55 | 56 |
|---|---|---|---|---|---|---|---|---|---|---|---|
| Probe tack | 860 | 1,570 | 1,440 | 460 | 760 | 690 | 380 | 640 | 620 | 660 | 430 |
| Peel adhesion | 37 | ([2]) | 45 | 23 | 12 | 20 | 1 | 23 | 23 | 28 | 8 |
| Creep resistance | N.C. | N.C. | 0.01 | — | — | — | — | — | — | — | — |

[1] Sheared (cohesive failure).
[2] Delaminated.
[3] Cured 10 min. at 150° F.
[4] At 75° F.
[5] Film thickness 1.0–2.0 mils.
[6] All of Examples 34–56 cured for 5 min. at 150° F.
*Partial delamination.
**Less than 1 minute.
***None.

NOTE.—N.C.=No creep after 100 hours.

We claim:

1. An adhesive tape comprising a flexible backing and supported thereon a water-insoluble pressure-sensitive adhesive polymer of monomers consisting essentially of 1. an ionic monomer having the formula

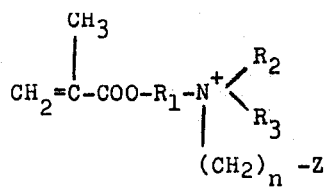

wherein $R_1$ is an alkylene group having from 2 to 12 carbon atoms, $R_2$ and $R_3$ are individually alkyl groups having from 1 to 4 carbon atoms, and Z represents $-SO_3^-$ when $n$ is 2 to 4 and represents $-COO^-$ when $n$ is 1 to 4, 2. at least one alkyl acrylate the molecules of which have up to 18 carbon atoms in the alkyl group, the average number of carbon atoms in such groups being from 4 to 14, the amount of said ionic monomer being from 0.5 to 20% by weight of the total essential monomers, except that when the amouunt of ionic monomer exceeds 10% by weight of the total essential monomers, the minimum average number of carbon atoms in the alkyl groups of the alkyl acrylate is 6 and increases progressively to 8 when the amount of ionic monomer reaches 20% by weight.

2. An adhesive tape as claimed in claim 1 in which $R_1$ has from 2 to 3 carbon atoms, $R_2$ and $R_3$ have from 1 to 2 carbon atoms, the average number of carbon atoms in the alkyl group of the alkyl acrylate is from 4 to 8, and the amount of ionic monomer is from 1 to 10% by weight of the total essential monomers.

* * * * *

UNITED STATES PATENT OFFICE
CERTIFICATE OF CORRECTION

Patent No. 3,861,948　　　　　　　　　Dated January 21, 1975

Inventor(s)　Carlos M. Samour et al.

It is certified that error appears in the above-identified patent and that said Letters Patent are hereby corrected as shown below:

Column 5, line 17, correct the spelling of "catalyst";

Column 5, line 27, "EXAMPLE 2-3" should be --EXAMPLES 2-3--

Column 5, line 33, correct the spelling of "refrigeration";

Column 7, line 42, after "following", insert --table:--;

In TABLE V, under column 24, delete "82.9" second occurrence;

In TABLE V, under column 26, change "80.5" to --82.9--;

In TABLE V, under column 28, change "85.4" to --80.5--;

In TABLE V, under column 31, change "77.4" to --85.4--;

In TABLE V, under column 33, after "77.4" in column 32, add --77.4--;

Column 12, line 9, correct the spelling of "amount".

Signed and sealed this 6th day of May 1975.

(SEAL)
Attest:

RUTH C. MASON
Attesting Officer

C. MARSHALL DANN
Commissioner of Patents
and Trademarks